Figure 1:
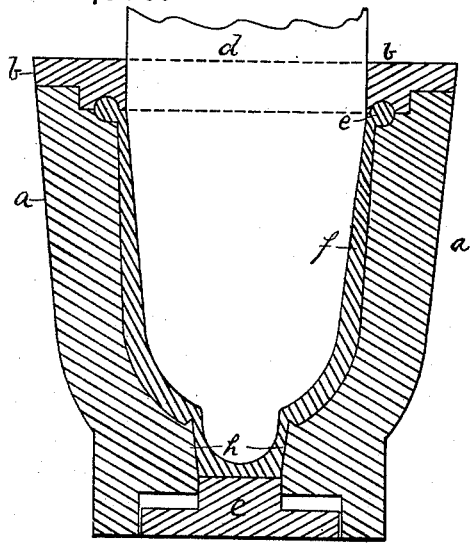

(No Model.)

D. C. RIPLEY.
MANUFACTURE OF GLASS LAMP SHADES AND GLOBES.

No. 257,385. Patented May 2, 1882.

Witnesses
L. Bacon
T. H. C. Huntemann

Inventor
Daniel C. Ripley
by his attys
Bakewell & Kerr

UNITED STATES PATENT OFFICE.

DANIEL C. RIPLEY, OF PITTSBURG, PENNSYLVANIA.

MANUFACTURE OF GLASS LAMP SHADES AND GLOBES.

SPECIFICATION forming part of Letters Patent No. 257,385, dated May 2, 1882.

Application filed March 22, 1882. (No model.)

*To all whom it may concern:*

Be it known that I, DANIEL C. RIPLEY, of Pittsburg, in the county of Allegheny and State of Pennsylvania, have invented a new and useful Improvement in the Manufacture of Glass Lamp Shades and Globes; and I do hereby declare the following to be a full, clear, and exact description thereof.

My invention relates particularly to that class of glass shades which are used upon burners of various descriptions, and which are of bell, dome, or globular form. Heretofore such shades have been made in two ways: first, by blowing a bulb of glass, cutting off, opening and forming one end, and then opening, warming, and flaring the other end; second, by pressing in a mold, the plunger entering at the wide end. The objection to the blown shade has been the great want of uniformity in the finished article and the expense attending the making of the same, it requiring the most skillful labor to produce them, and the operation being very slow, an expert blower producing only about eighty such shades to a turn. These blown shades are opened by a tool upon a chair, the tool being inserted into the end of the glass bulb or tube which is to be opened out, and the punty or snap which holds the article being rotated on the arms of the chair, so as to cause the thin heated sides of the shade to come into contact with the tool, and thus be gradually opened out in the way practiced in the manufacture of many articles of glassware. These shades have a diameter varying from ten to fourteen inches, and the operation of opening them out is one requiring great care and skill. If, however, the blower in forming the tube has blown to one side and made a tube with one thick and one thin side, the effect of the rotation on the chair is to cause the thick side, which is heavier, to stretch more than the thin side, and thus produce in the finished shade sides having a different angle of inclination. Again, if the blower makes the bulb too long the shade will be of greater height than is required. The contrary is true if he makes it too short. All these things tend to produce great lack of uniformity and of finish in the product of the blown method. There is uniformity of product in the pressed method mentioned; but the sides are very thick, and the amount of glass necessary to make a shade is much greater than in the blown method. These things increase the expense of the article and produce a much more clumsy and heavier article than is desired.

To enable others skilled in the art to make and use my improvement, I will now describe it by reference to the accompanying drawings, in which—

Figure 2:
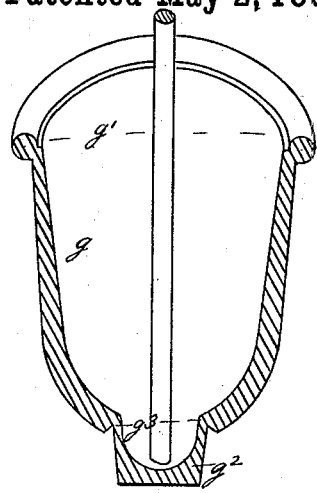
Figure 3:
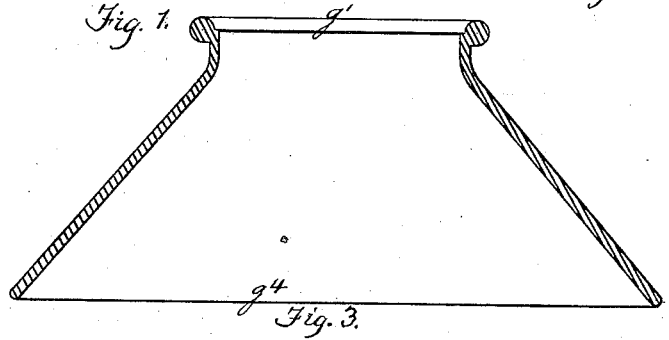
Figure 4:
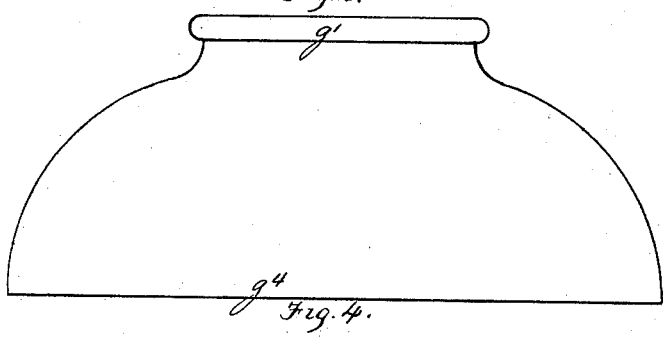
Figure 5:
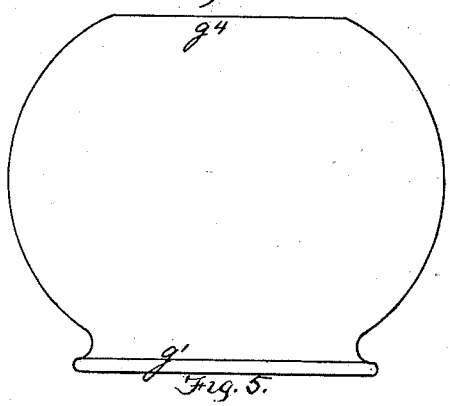

Figure 1 is a vertical section of the mold and plunger, illustrating the first step in the operation. Fig. 2 is a perspective view of the product of the mold and plunger of Fig. 1. Fig. 3 is a vertical section of the shade made by my improved process. Figs. 4 and 5 are views of other forms of shade made by my improved process.

Like letters of reference indicate like parts in each.

I form a mold, $a$, of any desired construction, having a ring, $b$, which fits upon the top, through which the plunger works, and a bottom, $c$, on a suitable stand, upon which the mold is placed. A plunger, $d$, is used with the mold and works through the ring $b$ to press up the article in the mold.

Between the plunger and the side of the mold is a cavity, $f$, which forms the sides of the shade-casting $g$, and around the top of the mold, and formed partially in the mold $a$ and partially in the ring $b$, is a ring or lip cavity, $e$, which forms a ring around the small or upper opening of the shade. In the bottom of the mold-cavity $g$ is a recess or well, $h$, the sides of which approach much more closely to the plunger than do the sides of the mold-cavity $f$.

In using the mold the molten glass is placed in the mold-cavity $f$ and the plunger is brought down into the mold and presses up the shade-casting $g$. (Shown in Fig. 2.) A rod or bar of iron is inserted into the same through the opening $g'$, and the lower end, $g^2$, of the casting is knocked out, the line of fracture occurring at $g^3$, said line being already predetermined by the offset in the mold, which makes the casting thinner at that point. The casting is then grasped by the snap at the upper end, $g'$, and the lower end is inserted into a glory-hole and reheated. It is then taken to the chair and opened out by the tool, as hereinafter described, with relation to the blowing process.

The parts of the casting being perfectly proportioned in the mold, the article will not be distorted or drawn out of shape by the rotation of the snap upon the chair, but will turn therein with all the precision of a centered wheel. The workman can then open out the article without difficulty to the required diameter. The height, the size of the opening $g'$, and the uniformity of the sides being absolutely determined and fixed by the molding of the casting $g$, are no longer left to the workman, and the result is that uniformity of manufacture and proper proportioning of the parts of the finished shade are obtained.

The diameter to be given to the drawn opening of the shade is fixed by a gage in the hands of the workman.

It is not necessary that the mold should be constructed as shown at $h$, nor that the lower opening of the casting $g$ should be opened in that way. This may be done by drawing the mold to a point at $h$, and then, when the casting is removed therefrom, forming a knob upon the end by reheating and cutting off the said knob in the manner usually practiced in the manufacture of blown chimneys. The result of the operation is a shade such as shown in Figs. 3, 4, and 5, having a molded opening, $g'$, and an expanded, drawn, or flared opening, $g^4$.

I prefer to make the casting $g$ with thickened sides, as they extend down in the mold, so as to provide the finished shade with sides of equal thickness throughout, the extra thickness in the lower end of the casting $g$ being used in giving the larger diameter to the lower end, $g^4$.

It is plain that any desired form of flare or opening may be given to the shade. Three forms are shown—one in Fig. 3, which is a regular taper, one in Fig. 4, which is of dome shape, and one in Fig. 5, which is of globe shape.

By the use of my invention a workman whose product heretofore in the manufacture of blown shades has not been greater than eighty shades a turn, is enabled to make in the same time a greatly-increased product. In addition to this, I am enabled to use less skillful, and consequently cheaper, labor; and, further, I secure the proper proportioning of the parts and uniformity of product. I can make a shade of any desired degree of thinness.

Instead of being bell form, the casting $g$ may be of tubular shape; and instead of making the opening at the outer end of the casting after it has been removed from the mold, it may be done in the mold by the plunger, as is the case with other articles of glassware.

What I claim as my invention, and desire to secure by Letters Patent, is—

1. The method herein described of making glass shades, consisting in forming a cup-shaped or tubular casting by pressing in a mold, and then reheating and forming one end of the casting into the desired shape, substantially as and for the purposes described.

2. A glass shade having one end or opening molded and the other end or opening drawn, flared, or expanded, substantially as and for the purposes described.

In testimony whereof I have hereunto set my hand.

DANIEL C. RIPLEY.

Witnesses:
T. B. KERR,
W. T. HUTCHINSON.